(12) United States Patent
Morse et al.

(10) Patent No.: US 7,017,063 B2
(45) Date of Patent: Mar. 21, 2006

(54) SYSTEMS AND METHODS FOR CONTROLLING VOLTAGE REGULATOR MODULE POWER SUPPLIES

(75) Inventors: Douglas C. Morse, Hillsboro, OR (US); Randall S. Skinner, Beaverton, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 83 days.

(21) Appl. No.: 10/794,524

(22) Filed: Mar. 5, 2004

(65) Prior Publication Data

US 2005/0194958 A1    Sep. 8, 2005

(51) Int. Cl.
*G06F 1/26* (2006.01)
(52) U.S. Cl. .................................................. 713/340
(58) Field of Classification Search ................ 713/300, 713/310, 340
See application file for complete search history.

(56) References Cited

U.S. PATENT DOCUMENTS

| | | | | |
|---|---|---|---|---|
| 6,697,952 B1 * | 2/2004 | King | .................. | 713/300 |
| 6,748,545 B1 * | 6/2004 | Helms | .................. | 713/300 |
| 6,836,848 B1 * | 12/2004 | Yu et al. | .................. | 713/300 |

* cited by examiner

*Primary Examiner*—Gary L Laxton
(74) *Attorney, Agent, or Firm*—MacPherson Kwok Chen & Heid LLP; Greg J. Michelson

(57) ABSTRACT

A voltage regulator module power supply, in accordance with an embodiment of the present invention, may be controlled by providing a modified voltage identification to the voltage regulator module power supply. The modified voltage identification may be utilized, for example, to apply margining and/or trimming techniques to the voltage regulator module power supply.

19 Claims, 3 Drawing Sheets

SYSTEMS AND METHODS FOR CONTROLLING VOLTAGE REGULATOR MODULE POWER SUPPLIES

TECHNICAL FIELD

The present invention relates generally to electrical circuits and, more particularly, to power supplies.

BACKGROUND

Power supplies are well known and employed generally to provide one or more power supply voltages to an electrical device. In some applications, it may be advantageous to be able to adjust a power supply voltage.

For example, one technique, commonly referred to as margining, adjusts the power supply voltage of a power supply to an upper limit and/or a lower limit of an operational range of a system (e.g., the power supply and an electrical device supplied by the power supply). Margining is typically employed to verify the integrity and the reliability of the system. Another technique, commonly referred to as trimming, involves measuring the power supply voltage and adjusting the power supply voltage up or down to compensate, for example, for errors in the power supply or losses (e.g., line losses) associated with the delivery of the power to a load.

One type or class of power supply may be referred to as a voltage regulator module (VRM) power supply or VRM-style power supply. For example, an exemplary VRM power supply system 100, as illustrated in FIG. 1, supplies power 108 (labeled load power) to a load 104 (e.g., an integrated circuit or any type of electrical device). A voltage level associated with power 108 supplied to load 104 is based on a digital code 110 (referred to as a voltage identification, voltage ID, or VID) provided by load 104 to a VRM power supply 102 (labeled VRM). Digital code 110 (labeled VID) provides information to VRM power supply 102 as to a voltage level required by load 104 to operate properly.

One drawback of a conventional VRM power supply system is that a voltage level supplied by the VRM power supply is controlled solely by the digital code provided by the load. Consequently, there is generally no way to adjust the voltage level (e.g., via margining or trimming) provided by the VRM power supply, such as for example to test or account for losses or other characteristics of the system. As a result, there is a need for improved techniques for VRM power supply systems.

SUMMARY

Systems and methods are disclosed herein to control power supplies. For example, in accordance with an embodiment of the present invention, a VRM power supply is controlled by providing a modified digital code to the VRM power supply compared to a digital code provided by a load. The modified digital code may be employed to provide, for example, margining and/or trimming techniques to a voltage level provided by the VRM power supply.

More specifically, in accordance with one embodiment of the present invention, a system includes a voltage regulator module power supply adapted to receive a first digital code and provide a supply voltage having a voltage level determined by the first digital code; a load adapted to receive the supply voltage and provide a voltage identification; and a circuit adapted to receive the voltage identification and a control signal and provide the first digital code to the voltage regulator module power supply, wherein a value of the first digital code is determined by the control signal.

In accordance with another embodiment of the present invention, a voltage regulator module power supply system includes a voltage regulator module power supply adapted to receive a first voltage identification and provide a supply voltage based on the first voltage identification; and a control circuit adapted to receive a control signal and provide the first voltage identification to the voltage regulator module power supply, wherein a value of the first voltage identification is determined by the control signal.

In accordance with another embodiment of the present invention, a method of controlling a voltage level of a supply voltage from a voltage regulator module power supply includes intercepting a first voltage identification provided by a load and intended to set the voltage level of the supply voltage from the voltage regulator module power supply; modifying a value of the first voltage identification if desired; and providing the first voltage identification to set the voltage level of the supply voltage of the voltage regulator module power supply.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
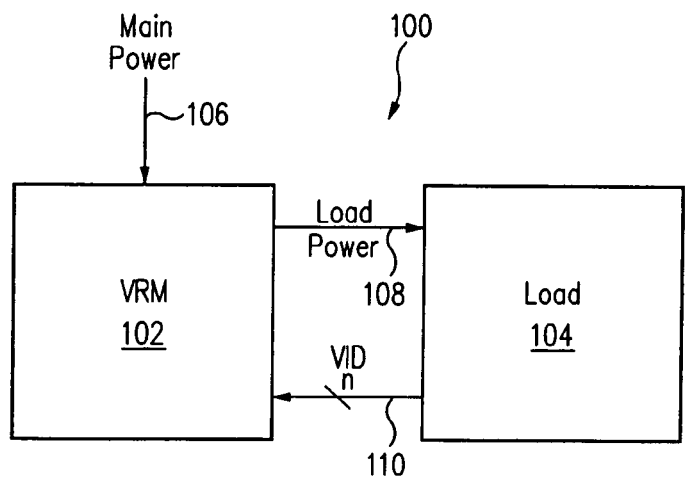
FIG. 1 shows a block diagram illustrating a conventional voltage regulator module power supply system.
Figure 2:
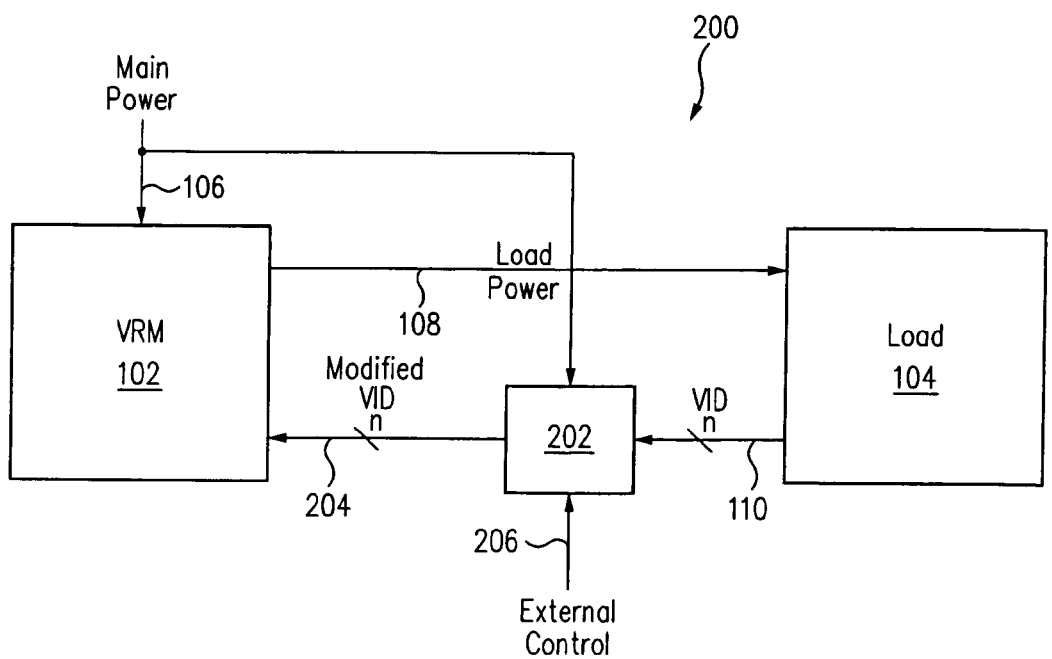
FIG. 2 shows a block diagram illustrating a voltage regulator module power supply system in accordance with an embodiment of the present invention.

FIG. 2 shows a block diagram illustrating a voltage regulator module (VRM) power supply system 200 in accordance with an embodiment of the present invention. VRM power supply system 200 includes VRM power supply 102, load 104, and a block 202. VRM power supply 102 may represent a conventional VRM power supply and load 104 may represent any type of conventional electrical device (e.g., an integrated circuit) that may provide digital code 110.

Block 202 receives a power supply 106 (e.g., via a main power source), digital code 110, and a control signal 206 and provides a digital code 204 to VRM power supply 102. Block 202, under control of control signal 206, provides digital code 204, which may be a modified version of digital code 110. Consequently, block 202 may be employed to intercept and modify digital code 110 to provide digital code 204 to VRM power supply 102 within VRM power supply system 200. As an example, block 202 may be controlled to force VRM power supply 102 to a voltage level other than that requested by load 104 via digital code 110. Block 202 may be included and utilized, for example, to add margining and/or trimming capability to a VRM power supply system (such as illustrated with VRM power supply system 200).

In general, block 202 receives digital code 110 from load 104 and provides to VRM power supply 102 digital code 204, which may be a modified version of digital code 110. Digital code 110 may be modified as desired based upon a specific application or specified requirements of VRM power supply 102 or of VRM power supply system 200. As mentioned, digital code 110 may also be modified and provided as digital code 204 to command VRM power supply 102 to provide a voltage level applicable for trimming and/or margining.

Alternatively, block 202 may also be implemented, for example in accordance with an embodiment of the present invention, in a VRM power supply system (such as VRM power supply system 200) to generate digital code 204 without necessarily receiving digital code 110. For example, if load 104 is not capable of providing digital code 110 (e.g., load 104 is not designed to provide digital code 110 or where the function of providing digital code 110 is disabled), block 202 may be controlled to provide a desired value for digital code 204 to VRM power supply 102. Thus, block 202 may be implemented in systems desiring a VRM power supply even though the load may not provide a digital code (e.g., digital code 110).

Figure 3:
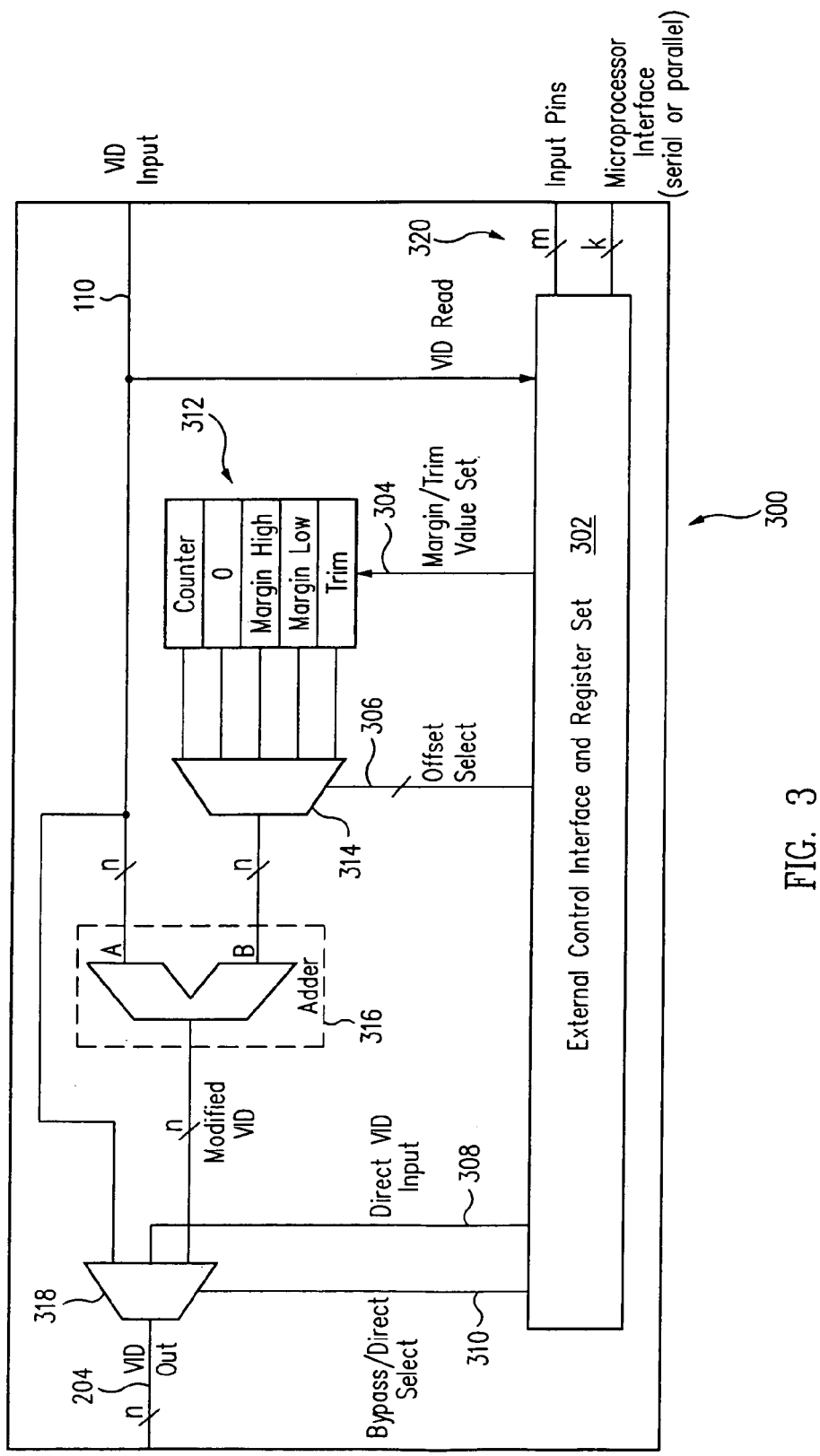
FIG. 3 shows an exemplary implementation for a portion of the voltage regulator module power supply system in accordance with an embodiment of the present invention.

FIG. 3 shows a circuit 300 that is an exemplary implementation for block 202 of VRM power supply system 200 in accordance with an embodiment of the present invention. Circuit 300 includes a control interface 302, one or more registers 312, multiplexers 314 and 318, and an adder 316.

Control interface 302 receives one or more control signals 320 (e.g., from input terminals or pins which may include a serial or a parallel microprocessor interface and/or digital control pins), with control signals 320 being an exemplary implementation of control signal 206. Control interface 302 may also receive digital code 110 (e.g., if provided by load 104).

Control interface 302 via a signal 304 (e.g., a margin/trim value set signal) may set one or more register values within registers 312. These register values may include for example a counter, a constant value (e.g., a zero value), margin values (e.g., a margin high value and a margin low value to be utilized during a margining operation), and one or more trim values (e.g., to be utilized during a trimming operation).

Control interface 302 controls multiplexer 314 via a signal 306 (e.g., an offset select signal) to select a value stored in registers 312 to provide to adder 316. Adder 316 adds the value (e.g., a negative or a positive value) provided by multiplexer 314 (e.g., provided on the B side) to digital code 110 (e.g., provided on the A side of adder 316) and provides the result to multiplexer 318. Control interface 302 controls multiplexer 318 via a signal 310 (e.g., a bypass/direct select signal) to select between the result from adder 316 or digital code 110 to provide as digital code 204.

Control interface 302 may also provide a signal 308 (e.g., a direct VID input signal) directly to multiplexer 318. Signal 308 represents a desired value for digital code 204 generated by control interface 302 or provided to control interface via control signals 320 (e.g., from a microprocessor or a logic circuit of a device). Control interface 302 may then control multiplexer 318 via signal 310 to select the result from adder 316, digital code 110, or signal 308 for circuit 300 to provide as digital code 204.

As illustrated in FIG. 3, adder 316 may be employed to modify digital code 110. For example, digital code 110 (i.e., the VID) represents a digital number corresponding to a particular voltage or voltage level. Adder 316 may be utilized to include an offset value (e.g., a negative or a positive value) to digital code 110, with this modified version of digital code 110 provided to VRM power supply 102 as digital code 204. The value of digital code 204 may correspond, for example, to a desired voltage level different than that requested by load 104 via digital code 110. For example, digital code 204 may correspond to the desired margin voltage or trim voltage.

As an exemplary operational implementation of VRM power supply system 200 (with circuit 300 incorporated for block 202), upon application of power supply 106, circuit 300 operates initially in a default or an initial state, with digital code 110 allowed to pass unaltered as digital code 204. For example, multiplexer 318 may be controlled to select digital code 110 to pass through or adder 316 may add a zero value to digital code 110 with multiplexer 318 selecting the result from adder 316 to provide as digital code 204. Circuit 300, when desired, may then be controlled to provide a digital word to adder 316 (e.g., select a value from registers 312 to provide to the B side of adder 316) to sum with digital code 110 and provide as digital code 204 via multiplexer 318.

Circuit 300 may be controlled, for example, via digital control pins to select preprogrammed values or modes of operation within circuit 300. Alternatively, or in addition to digital control pins, circuit 300 may include a microprocessor interface or other type of logic interface which allows software control of registers 312 to set desired values and control the operation of circuit 300 (e.g., control modes and values provided or selected). Furthermore, digital code 110 may be read directly or via control interface 302 (e.g., through a port or microprocessor interface) by a microprocessor (e.g., a microcontroller, logic circuit, or other type of logic device), which could then determine a desired value and provide the desired value directly via control interface 302 (i.e., signal 308) as digital code 204. Alternatively, microprocessor may not be able to read digital code 110, but simply provide a desired value for digital code 204 to control interface 302 which then sets this value for digital code 204, as described herein.

It should be understood that block 202 may be implemented as shown in FIG. 2 for a VRM power supply system. Alternatively, block 202 may be incorporated into a VRM power supply (e.g., into VRM power supply 102) or designed into a load (e.g., into load 104), such that a voltage level supplied by the VRM power supply may be modified by one or more control signals provided to the VRM power supply or the load, respectively.

Furthermore, control interface 302 may be only an optional component of circuit 300 or be implemented in a manner (e.g., with conventional circuitry) by one skilled in the art to perform one or more of the desired functions described herein. As an example, control interface 302 may be eliminated from circuit 300 and signals 304, 306, 308, and/or 310 may be provided directly via control signals 320 (e.g., by a microcontroller).

Figure 4:
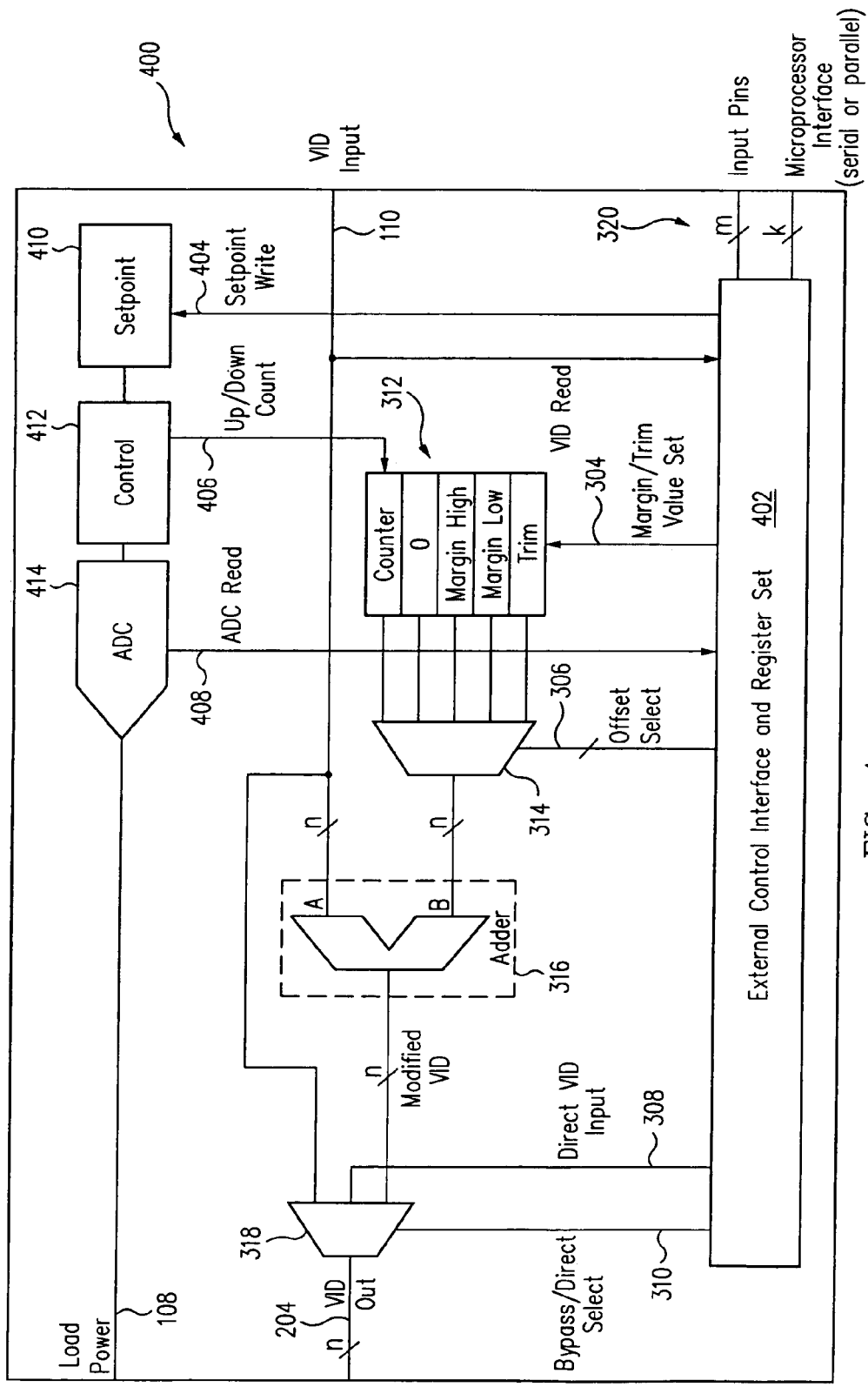
FIG. 4 shows an exemplary implementation for a portion of the voltage regulator module power supply system in accordance with an embodiment of the present invention.

FIG. 4 shows a circuit 400 that is an exemplary implementation for block 202 of VRM power supply system 200 in accordance with an embodiment of the present invention.

Circuit 400 is similar to circuit 300 (FIG. 3) and therefore the description of similar features will not be repeated.

Circuit 400, in addition to that described with respect to circuit 300, includes a register 410, a control circuit 412, and an analog-to-digital converter (ADC) 414. ADC 414 couples to power 108 (i.e., VRM load power) and monitors VRM power supply 102. Register 410 (which may be combined with registers 312) may store a value (e.g., a setpoint value) corresponding, for example, to a desired voltage a user would like VRM power supply 102 to provide. The value stored by register 410 may be provided by or via a control interface 402 (similar to control interface 302 of FIG. 3) through a signal 404 (e.g., labeled setpoint write).

Control circuit 412 monitors the values provided by ADC 414 and, based on the value stored by register 410, determines whether to increase or decrease digital code 204 to change a value of power 108 provided by VRM power supply 102. For example, control circuit 412 via a signal 406 (labeled up/down count) may change a value stored in register 312 (e.g., increment a counter value stored in register 312 up or down), with the value selected by multiplexer 314, summed by adder 316 with digital code 110, and the result provided via multiplexer 318 as digital code 204.

In terms of general operation, for example, a user may utilize circuit 400 to provide a closed loop feedback circuit to adjust digital code 204 so that power 108 of VRM power supply 102 matches a setpoint value held in register 410. For example, control circuit 412 would compare a digitized load power signal from power 108, provided by ADC 414, with the setpoint value stored in register 410. Control circuit 412, based on the comparison, may increment or decrement a counter value stored in register 312 to increase or decrease the value of digital code 204 to change the voltage level provided by VRM power supply 102.

Alternatively, a closed loop feedback circuit could be formed by using control interface 402 and control signals 320 (e.g., a microprocessor interface) to read the digitized load power signal from power 108 provided by ADC 414 via a signal 408 (labeled ADC read). A user, a microprocessor, or other type of logic device could then determine if and in what direction to adjust digital code 204 (e.g., via control signals 320, control interface 402, and signal 304, 306, 308, and/or 310 as described above for example for circuit 300) to obtain the desired voltage level from VRM power supply 102.

Embodiments described above illustrate but do not limit the invention. It should also be understood that numerous modifications and variations are possible in accordance with the principles of the present invention. Accordingly, the scope of the invention is defined only by the following claims.

We claim:

1. A system comprising:
    a voltage regulator module power supply adapted to receive a first digital code and provide a supply voltage having a voltage level determined by the first digital code;
    a load adapted to receive the supply voltage and provide a voltage identification; and
    a circuit having an adder and adapted to receive the voltage identification and a control signal and provide the first digital code to the voltage regulator module power supply, wherein a value of the first digital code is determined by the control signal which determines if a first value is to be summed with the voltage identification and provided as the first digital code.

2. The system of claim 1, wherein the circuit provides the voltage identification, a modified version of the voltage identification based on the voltage identification, or a second voltage identification as the first digital code as determined by the control signal.

3. The system of claim 1, wherein the circuit provides margining and/or trimming capability to the system.

4. The system of claim 1, wherein the circuit comprises:
    a control interface adapted to receive the voltage identification and the control signal;
    registers adapted to store margin and trim values;
    wherein the adder is adapted to sum the voltage identification with a value received from one of the registers; and
    a first multiplexer adapted to select from the voltage identification and a result from the adder to provide as the first digital code to the voltage regulator module power supply.

5. The system of claim 4, wherein the first multiplexer is further adapted to select a second voltage identification provided by the control interface to provide as the first digital code to the voltage regulator module power supply.

6. The system of claim 4, wherein the control interface comprises a microprocessor interface and/or digital control pins.

7. The system of claim 4, wherein the control interface provides one or more values to store in the registers.

8. The system of claim 1, wherein the circuit is formed as part of the voltage regulator module power supply or the load.

9. The system of claim 1, wherein the control signal provides a setpoint value, with the circuit adapted to compare the setpoint value to a value of the supply voltage and adjust a value of the first digital code based on the comparison.

10. A voltage regulator module power supply system comprising:
    a voltage regulator module power supply adapted to receive a first voltage identification and provide a supply voltage based on the first voltage identification; and
    a control circuit adapted to receive a control signal and provide the first voltage identification to the voltage regulator module power supply, wherein a value of the first voltage identification is determined by the control signal; wherein the control circuit comprises:
        registers adapted to store at least one of a margin value and a trim value;
        an adder adapted to add a value from the registers with the first voltage identification to provide a modified first voltage identification; and
        a first multiplexer adapted to select from the first voltage identification and the modified first voltage identification to provide as the first voltage identification to the voltage regulator module power supply.

11. The voltage regulator module power supply system of claim 10, wherein the voltage regulator module power supply incorporates the control circuit.

12. The voltage regulator module power supply system of claim 10, wherein the control circuit is further adapted to receive a second voltage identification from a load and provide the second voltage identification or a modified version of the second voltage identification as the first voltage identification to the voltage regulator module power supply.

13. The voltage regulator module power supply system of claim 10, wherein margining and/or trimming functions are controlled via the control signal.

14. The voltage regulator module power supply system of claim 10, wherein the registers are further adapted to store a counter value, with the control circuit monitoring the supply voltage and adjusting the counter value based on the monitoring.

15. The voltage regulator module power supply system of claim 10, wherein the control circuit further comprises at least one register adapted to store a setpoint value, with the value of the first voltage identification based on the setpoint value.

16. A method of controlling a voltage level of a supply voltage from a voltage regulator module power supply, the method comprising:

intercepting a first voltage identification provided by a load and intended to set the voltage level of the supply voltage from the voltage regulator module power supply;

modifying a value of the first voltage identification if desired by summing the first voltage identification with a stored value; and providing the first voltage identification to set the voltage level of the supply voltage of the voltage regulator module power supply.

17. The method of claim 16, wherein the value of the first voltage identification in the modifying operation corresponds to a margin value or a trim value.

18. The method of claim 16, further comprising:
generating a second voltage identification; and
providing the second voltage identification rather than the first voltage identification to set the voltage level of the supply voltage for the voltage regulator module power supply.

19. The method of claim 16, wherein the intercepting, the modifying, and the providing operations occur within the voltage regulator module power supply.

* * * * *